United States Patent
Fujii et al.

(10) Patent No.: US 6,833,985 B2
(45) Date of Patent: Dec. 21, 2004

(54) VARIABLE CAPACITANCE ELEMENT

(75) Inventors: Yasutaka Fujii, Machida (JP); Shinji Kobayashi, Sagamihara (JP); Hiroshi Kawai, Yokohama (JP); Koji Takemura, Yokohama (JP); Yoshihiro Konaka, Sagamihara (JP); Masato Kobayashi, Machida (JP)

(73) Assignee: Murata Manufacturing Co., Ltd., Kyoto (JP)

( * ) Notice: Subject to any disclaimer, the term of this patent is extended or adjusted under 35 U.S.C. 154(b) by 0 days.

(21) Appl. No.: 10/379,082

(22) Filed: Mar. 5, 2003

(65) Prior Publication Data

US 2003/0223176 A1 Dec. 4, 2003

(30) Foreign Application Priority Data

Mar. 8, 2002 (JP) ........................................ 2002-063141
Mar. 11, 2002 (JP) ........................................ 2002-065540

(51) Int. Cl.[7] .............................. H01G 7/06; H01G 5/01; H01G 5/16
(52) U.S. Cl. ........................ 361/281; 361/278; 361/290
(58) Field of Search ................................. 361/277–281, 361/287, 290

(56) References Cited

U.S. PATENT DOCUMENTS

| 6,426,687 B1 | 7/2002 | Osborn | |
| 2002/0079743 A1 * | 6/2002 | Ma et al. | 307/109 |
| 2002/0131230 A1 * | 9/2002 | Potter | 361/277 |
| 2002/0171517 A1 * | 11/2002 | Guo et al. | 333/262 |
| 2003/0169146 A1 * | 9/2003 | Kawai et al. | 337/333 |

* cited by examiner

*Primary Examiner*—Eric Thomas
(74) *Attorney, Agent, or Firm*—Keating & Bennett, LLP

(57) ABSTRACT

A variable capacitance element includes a coplanar line or signal conduction and a movable body, which are vertically displaced through a supporting bar and which are provided on a substrate. A movable electrode is provided between a first driving electrode and second and third driving electrodes which are movable electrodes. Voltage is applied between the movable electrodes, such that one of the movable electrodes is pressed against the coplanar line through a dielectric film. Thus, high frequency signals conducting through the coplanar line are shut off. When voltage is applied between the other electrodes, the movable electrode and the dielectric film are moved apart from the coplanar line. Thus, high frequency signals are conducted through the coplanar line.

6 Claims, 15 Drawing Sheets

VARIABLE CAPACITANCE ELEMENT

BACKGROUND OF THE INVENTION

1. Field of the Invention

The present invention relates to a variable capacitance element included in a high-frequency circuit. In particular, the present invention relates to a variable capacitance element, for use as, for example, a variable capacitance switch or a variable capacitor. In this case, the variable capacitance switch performs switching operations on high-frequency signals by changing electrostatic capacitance.

2. Description of the Related Art

Generally, a variable capacitor is known. A variable capacitor displaces, for example, a movable electrode with respect to a fixed electrode by using electrostatic gravity so as to change the spacing between these electrodes. Thus, the electrostatic capacitance is variably selected.

This kind of conventional variable capacitor is substantially similar to an electrostatically-driven switch as disclosed in Japanese Unexamined Patent Application Publication No. 2000-188050. The variable capacitor includes a movable electrode on the right side of the substrate including a flexible supporting bar. The flexible supporting bar bends toward the front side of the substrate. The movable electrode is spaced from and faces toward the fixed electrode provided on the substrate. Driving electrodes are provided on the substrate side and the movable electrode side. Voltage is applied between the driving electrodes externally such that electrostatic gravity is produced.

When voltage is not applied between the driving electrodes, the supporting bar freely supports the movable electrode. Thus, a predetermined space (electrostatic capacitance) is set between the fixed electrode and the movable electrode. When voltage is applied between the driving electrodes, the supporting bar is bent and is deformed due to the electrostatic gravity such that the movable electrode is displaced toward the fixed electrode. Thus, the electrostatic capacitance between these electrodes increases.

FIG. 4A schematically shows an example of a shunt switch element, which is a variable capacitance element. A shunt switch element 130 includes a substrate 131 containing a dielectric. A coplanar line 132 is provided on the substrate 131. High-frequency signals are conducted through the coplanar line 132. Three lines 133g1, 133s and 133g2 are aligned at a desired interval on the substrate 131. The middle line 133s is a signal line. The lines 133g1 and 133g2 on both sides of the signal line 133s are ground lines.

On the coplanar line 132, both ends of an electrode bridge 134 are joined with the ground lines 133g1 and 133g2. The electrode bridge 134 crosses over the signal line 133s. FIG. 4B is a top view of FIG. 4A schematically showing the coplanar line 132 and the electrode bridge 134.

When direct-current voltage is applied between the signal line 133s and the electrode bridge 134 included in the shunt switch element 130, electrostatic gravity is produced between the signal line 133s and the electrode bridge 134. As a result, the electrode bridge 134 is pulled toward the signal line 133s due to the electrostatic gravity. Therefore, the electrostatic capacitance changes between the electrode bridge 134 and the signal line 133s of the coplanar line 132.

It is important to note that equivalent circuits of the coplanar line 132 and the electrode bridge 134 can be expressed as shown in FIG. 4C. In FIG. 4C, the reference letter C indicates an electrostatic capacitance between the signal line 133s and the electrode bridge 134. The reference letter L indicates an inductance component of the electrode bridge 134. The reference letter R indicates a resistance component of the electrode bridge 134.

When the space between the signal line 133s and the electrode bridge 134 is reduced, and when the electrostatic capacitance C between the signal line 133s and the electrode bridge 134 is increased, the self-oscillating frequency of the LC series circuit in FIG. 4C decreases. At the self-oscillating frequency of the LC series circuit, the impedance of the LC series circuits is minimized. Thus, when viewing the ground lines 133g1 and 133g2 from the signal line 133s through the electrode bridge 134, a short circuit occurs at high frequencies of the self-oscillating frequencies of the LC series circuit. As a result, the conducting of high frequency signals through the coplanar line 132 (signal line 133s) is turned OFF.

On the other hand, when the space between the signal line 133s and the electrode bridge 134 is increased and when the electrostatic capacitance C between the signal line 133s and the electrode bridge 134 is decreased, the self-oscillating frequency of the LC series circuit in FIG. 4C increases. As a result, when viewing from the signal line 133s through the electrode bridge 134, the ground lines 133g1 and 133g2 are open to high frequencies. Therefore, the conducting of high-frequency signals through the coplanar line 132 is turned ON.

As described above, the shunt switch element 130 controls ON and OFF of the conducting of high frequency signals through the coplanar line 132. In this case, the electrode bridge 134 is displaced and the electrostatic capacitance C is variable between the electrode bridge 134 and the signal line 133s.

It is important to note that, in the above-described conventional technology, the movable electrode is held at a predetermined location by its own force (spring force) when voltage is not applied between the driving electrodes. However, when a variable capacitance element is used, an external force such as vibration and impact may be applied to the substrate. Thus, when external forces act thereon in a direction perpendicular to the substrate, the supporting bar is bent and is deformed by the external force. As a result, the movable electrode is displaced with respect to the fixed electrode.

Therefore, while the variable capacitor is operating, the electrostatic capacitance of the capacitor may be changed due to vibration and/or impact even without voltage being applied to the driving electrode. Therefore, the vibration resistance and reliability are reduced. This is a disadvantage.

Furthermore, in the conventional variable capacitance element, when two driving electrodes are too close to each other and contact each other, they remain fixed together even after the voltage is terminated. In this case, returning the variable capacitance element to the normal operating state is difficult using only the stability of the supporting bar. This is another disadvantage.

In the construction of the shunt switch element 130, the electrode bridge 134 functions as both a driving electrode and an electrode for electrostatic capacitance. In this case, the driving electrode is paired with a fixed driving electrode to produce electrostatic gravity. The electrode for electrostatic capacitance is paired with the signal line 133s to determine the self-oscillating frequency of the LC series circuit shown in FIG. 4C.

However, when high frequency signals are conducted through the coplanar line 132, such as extremely high frequency (EHF) signals, the amount of electrode surface area of the electrode bridge 134 must be reduced. Thus, the conducting of high frequency signals through the coplanar line 132 can be turned ON and OFF precisely by using changes in the self-oscillating frequency of the LC series circuit using the change in electrostatic capacitance as described above. On the other hand, when the electrode bridge 134 is small, large direct-current voltages must be applied between the electrode bridge 134 and the fixed driving electrode in order to produce electrostatic gravity for displacing the electrode bridge 134. However, the electrode bridge 134 is preferably displaced by using low direct-current voltage. Therefore, from the viewpoint of the displacement driving, the size of the electrode bridge 134 is preferably increased.

As described above, the size of the electrode bridge 134 for controlling ON and OFF of the conducting of high frequency signals is different from the size of the electrode bridge 134 that is suitable for displacement of the electrode bridge 134 itself. Thus, designing the electrode bridge 134 is difficult.

SUMMARY OF THE INVENTION

To overcome the problems described above, preferred embodiments of the present invention provide a variable capacitance element which prevents the displacement of a movable electrode due to an external force and/or the fixing of a driving electrode, which stabilizes the operation of elements and which greatly improves vibration resistance and reliability.

Preferred embodiments of the present invention also provide a variable capacitance element which greatly improves the degree of freedom of electrode design.

According to a preferred embodiment of the present invention, a variable capacitance element includes a substrate, a high frequency signal conducting portion on the substrate, a movable body located above and spaced from the substrate and facing toward at least a portion of the high frequency signal conducting portion, a movable electrode provided on the movable body and facing toward the high frequency signal conducting portion, a fixed side electrode provided on the substrate for movable body displacement, in an area facing toward the movable body and spaced from the high frequency signal conducting portion, the movable body includes an insulating semiconductor or an insulator against high frequency signals, and a movable side electrode for movable body displacement provided on a substrate facing surface of the movable body, facing toward the fixed side electrode for movable body displacement on the substrate, and spaced from the movable electrode. The movable side electrode for movable-body displacement and the fixed side electrode for movable body displacement are included in a capacitance variable unit, which displaces the movable body toward the substrate by using electrostatic gravity produced by applying direct-current voltage between the movable side electrode for movable body displacement and the fixed side electrode for movable body displacement so as to vary electrostatic capacitance between the movable electrode in the movable body and the high frequency signal conducting portion on the substrate.

The variable capacitance element preferably further includes an upper member provided above and spaced from the movable body. The movable side electrode for movable body displacement is preferably provided on an upper member surface facing toward the movable body instead of on the substrate facing surface of the movable body. The fixed side electrode for movable body displacement is preferably provided on the upper member and faces toward the movable side electrode for movable body displacement instead of on the substrate. The movable side electrode for movable body displacement and the fixed side electrode for movable body displacement are preferably included in a capacitance variable unit, which displaces the movable body toward the upper member by using electrostatic gravity produced by applying direct-current voltage between the movable side electrode for movable body displacement and the fixed side electrode for movable body displacement so as to vary electrostatic capacitance between the movable electrode in the movable body and the high frequency signal conducting portion on the substrate.

The high frequency signal conducting portion is preferably one of a coplanar line and a microstrip line. The variable capacitance element is preferably a shunt switch element for controlling ON and OFF of signal conduction of the coplanar line or the microstrip line, which is the high frequency signal conducting portion, by using a change in electrostatic capacitance between the movable electrode and the high frequency signal conducting portion.

According to another preferred embodiment of the present invention, a variable capacitance element includes a substrate, a high frequency signal conducting portion provided on the substrate for conducting signals from the outside, a movable electrode movably provided on the substrate for switching conduction states for signals conducting to the high frequency signal conducting portion by moving toward or away from the high frequency signal conducting portion, a first driving electrode provided on the substrate and facing toward the movable electrode for displacing the movable electrode to a first switching position near the high frequency signal conducting portion by the conduction of high frequency signals, and a second driving electrode provided on the opposite side of the first driving electrode through the movable electrode for displacing the movable electrode to a second switching position away from the high frequency signal conducting portion by the conduction of high frequency signals.

With this construction, the movable electrode is provided between the first and second driving electrodes. Therefore, when voltage is applied to one of the first and second driving electrodes, the movable electrode is forcibly displaced to the first switching position or to the second switching position using the electrostatic gravity. Thus, the movable electrode is driven in both directions with respect to the non-conducting position. As a result, even when external forces, such as vibration and impact, are applied to the substrate, the conducting and shutting states of the high frequency signal conducting portion for high frequency signals are switched in accordance with the position of the movable electrode.

Preferably, the variable capacitance element further includes a third driving electrode provided in a portion of the movable body, facing toward the second driving electrode. The high frequency signal conducting portion is preferably located near the first driving electrode on the substrate. The movable body is located between the first driving electrode and the second driving electrode, for displacement between the first and second driving electrodes. The movable electrode is preferably located in a portion of the movable body, facing toward the high frequency signal conducting portion and the first driving electrode.

Thus, the movable electrode is movably supported by the movable body. The first driving electrode and the movable electrode are preferably located on one side with respect to the movable body. The second and third driving electrodes are preferably located on the other side. When voltage is applied between the electrodes on one side or between the electrodes on the other side, the movable electrodes are moved toward or away from the high frequency signal conducting portion.

Preferably, the variable capacitance element further includes a stopper for securely holding the movable electrode at the first switching position when the movable electrode is displaced by the first driving electrode.

Thus, when the movable electrode reaches the first switching position via electrostatic energy, the stopper provided in the substrate, the high frequency signal conducting portion and/or the first driving electrode abut with the movable electrode. Alternatively, the stopper provided in the movable electrode can abut with the substrate, the high frequency signal conducting portion and/or the first driving electrode. Therefore, the movable electrode is securely held.

The stopper may be provided in the movable electrode. The stopper may abut with the high frequency signal conducting portion when the movable electrode is displaced to the first switching position.

Thus, when the movable electrode reaches the first switching position, the stopper abuts with the high frequency signal conducting portion. Therefore, the movable electrode is securely held at the first switching position. The movable electrode and the high frequency signal conducting portion are preferably insulated by the stopper.

The stopper preferably includes a dielectric material. Thus, the stopper abuts with the high frequency signal conducting portion at the first switching position. At the second switching position, the stopper is moved away from the high frequency signal conducting portion. As a result, a capacitance component between the conductors included in the high frequency signal conducting portion are increased more at the first switching position in accordance with the dielectric constant of the dielectric material than at the second switching position. Therefore, high frequency signals to be conducted to the high frequency signal conducting portion are securely blocked.

The high frequency signal conducting portion preferably has a larger thickness than that of the first driving electrode in the front surface side of the substrate. Thus, at the first switching position, the stopper in the movable electrode side does not abut against the driving electrode. As a result, the stopper securely abuts against the high frequency signal conducting portion.

The stopper may be provided in the substrate or in the first driving electrode. The movable electrode may abut with the stopper when the movable electrode is displaced to the first switching position.

Thus, when the movable electrode reaches the first switching position, the movable electrode abuts with the stopper. Therefore, the movable electrode is securely held at the first switching position. As a result, the stopper insulates the movable electrode from the high frequency conducting portion.

Preferably, a stopper is provided on the movable body. The stopper securely holds the movable electrode in the first switching position when the movable electrode is displaced by the first driving electrode.

Thus, when the movable electrode reaches the first switching position, the stopper provided in the movable body abuts with the substrate and/or the first driving electrode. Therefore, the movable electrode is securely held at the first switching position. As a result, the stopper insulates the movable electrode from the high frequency conducting portion.

Preferably, the variable capacitance element preferably further includes another stopper for holding the movable electrode steady at the second switching position when the movable electrode is displaced by the second driving electrode.

Thus, when the movable electrode reaches the second switching position, another stopper abuts with the periphery. Therefore, the movable electrode is securely held in the second switching position. As a result, the movable electrode is prevented from displacing due to vibration or impact.

According to another preferred of the present invention, a variable capacitance element includes a substrate, a high frequency signal conducting portion provided on the substrate, a movable electrode movably provided on the substrate for changing the electrostatic capacitance between the movable electrode and the high frequency signal conducting portion by displacement toward or away from the high frequency signal conducting portion, a first driving electrode provided on the substrate and facing the movable electrode for displacing the movable electrode toward the high frequency signal conducting portion, and a second driving electrode provided on the opposite side of the first driving electrode through the movable electrode for displacing the movable electrode away from the high frequency signal conducting portion.

Thus, the movable electrode is provided between the first and second driving electrodes. These driving electrodes forcibly displace the movable electrode in both directions with respect to the non-conducting position by using electrostatic gravity. Therefore, even when external forces, such as vibration and impact, are applied to the substrate, voltage to be applied to the first and second driving electrodes is separately controlled. Thus, electrostatic capacitance between the high frequency signal conducting portion and the movable electrode can be changed with stability.

The variable capacitance element preferably further includes a voltage control unit for separately controlling magnitudes of voltage applied to the first and second driving electrode, respectively. Thus, the voltage control unit controls the relationship and voltage ratio of the voltages to be applied to the first and second driving electrodes, respectively. Therefore, the movable electrode is precisely driven in a wide range. As a result, the electrostatic capacitance between the high frequency signal conducting portion and the movable electrode can be changed continuously.

According to various preferred embodiments of the present invention, a movable electrode and a movable side electrode for movable body displacement are separately provided. The movable electrode is paired with a high frequency signal conducting portion. Electrostatic capacitance is produced between the movable electrode and the high frequency signal conducting portion. The movable side electrode for movable body displacement displaces a movable body including the movable electrode using electrostatic gravity.

Conventionally, an electrode (electrode bridge) is provided which functions as both an electrode (that is, a movable electrode) for causing electrostatic capacitance with the high frequency signal conducting portion and as an electrode (that is, a movable side electrode for movable body displacement) for displacing the electrode. Designing the electrode bridge has many constraints for achieving both of the functions. Therefore, the electrode design is very limited.

On the other hand, according to preferred embodiments of the present invention, the functions are implemented separately by the movable electrode and the movable side electrode for movable body displacement. Therefore, the movable electrode and the movable side electrode for movable body displacement can be designed independently. As a result, the flexibility in electrode design is greatly improved.

Conventionally, the electrode bridge itself is bent and is deformed to change electrostatic capacitance between a high frequency signal conducting portion and the electrode bridge. Therefore, metal in the electrode bridge is easily fatigued. On the other hand, according to preferred embodiments of the present invention, the movable electrode and the movable side electrode for movable body displacement are provided in the movable body. Furthermore, the movable body may include a flexible and insulating material other than a metal material. Therefore, the deterioration due to displacement of the movable body and/or the metal fatigue of the movable electrode and the movable side electrode for movable body displacement does not occur. As a result, the durability of the movable capacitance element is greatly improved.

Furthermore, the movable side electrode for movable body displacement is provided on a substrate facing surface of the movable body. Additionally, a fixed side electrode for movable body displacement is provided on the substrate. Therefore, an upper member is not required for mounting the fixed side electrode for movable body displacement. That is, the upper member can be removed. As a result, the construction and steps of manufacturing the variable capacitance element are greatly simplified.

In addition to the removal of the upper member, the movable body can be displaced toward the substrate using electrostatic gravity produced between the movable side electrode for movable body displacement and the fixed side electrode for movable body displacement. Therefore, the movable body is not moved upward away from the substrate by the electrostatic gravity. As a result, the height of the variable capacitance element is greatly reduced.

The high frequency signal conducting portion is preferably a coplanar line or a microstrip line. The variable capacitance element is preferably a shunt switch element. In this case, in order to precisely control ON and OFF of the signal conduction of the high frequency signal conducting portion, the movable electrode preferably has a small electrode surface in accordance with the high frequency of high frequency signals flowing through the high frequency signal conducting portion. On the other hand, in order to displace the movable body at low voltages, the electrode surface is preferably large where the movable side electrode for movable body displacement and the fixed side electrode for movable body displacement face toward each other.

According to various preferred embodiments of the present invention, the movable electrode and the movable side electrode for movable body displacement can be designed independently. Therefore, the movable electrode can be designed to have a size that is suitable for controlling ON and OFF of the signal conduction of the high frequency signal conducting portion. Thus, a shunt switch element is easily provided, which has greatly improved performance and which precisely controls ON and OFF of the conducting of high frequency signals with a reduced voltage supply.

Other features, elements, characteristics and advantages of the present invention will become more apparent from the following detailed description of preferred embodiments with reference to the attached drawings.

BRIEF DESCRIPTION OF THE DRAWINGS

FIG. 7 is an enlarged section diagram of an essential part of FIG. 6 showing a coplanar line, a driving electrode and so on;

DETAILED DESCRIPTION OF PREFERRED EMBODIMENTS

Preferred embodiments of the present invention will be described below with reference to drawings.

Figure 1A:
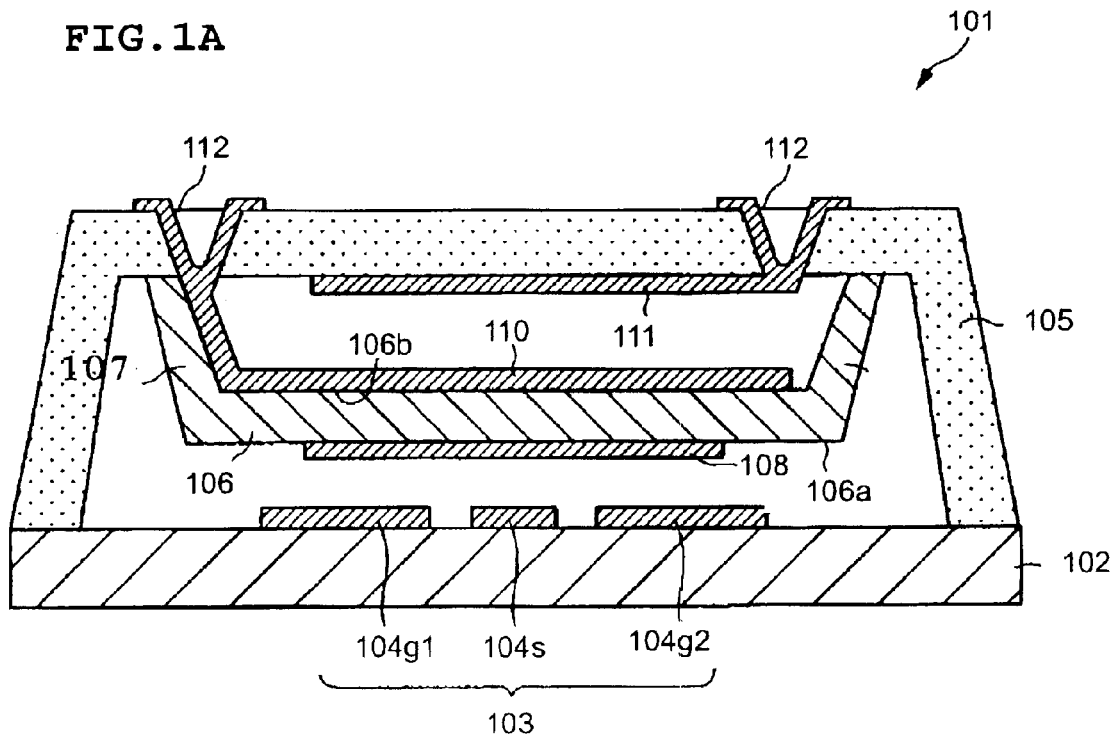
FIGS. 1A and 1B are diagrams showing a shunt switch element, which is a variable capacitance element according to a first preferred embodiment of the present invention.

FIG. 1A shows a schematic section diagram of a first preferred embodiment of a shunt switch element, which is a variable capacitance element.

A shunt switch element 101 according to the first preferred embodiment includes a substrate 102 including a dielectric. A coplanar line 103 is provided on the substrate 102. The coplanar line 103 defines a high frequency signal conducting portion for conducting high frequency signals of about 5 GHz or more, for example, as described above. Three lines 104g1, 104s and 104g2 are aligned on the substrate 102 at a desired interval. The middle line 104s is a signal line. The lines 104g1 and 104g2 on both sides of the signal line 104s are ground lines. An upper member 105 including glass, for example, is provided on the substrate 102 over the coplanar line 103 by leaving a certain amount of space in between. The upper member 105 and the substrate 102 are connected at the end of the substrate 102. A movable body 106 is provided in the space between the upper member 105 and the substrate 102. The movable body 106 faces a portion of the coplanar line 103 with a desired amount of space in between. The movable body 106 is supported by the upper member 105 through a supporting portion 107. The movable body 106 includes an insulator or a high-resistance (for example, with a resistance rate of about 1000 Ωcm to about 10000 Ωcm) semiconductor such as Si or GaAs having an insulating characteristic against high frequency signals.

Figure 1B:
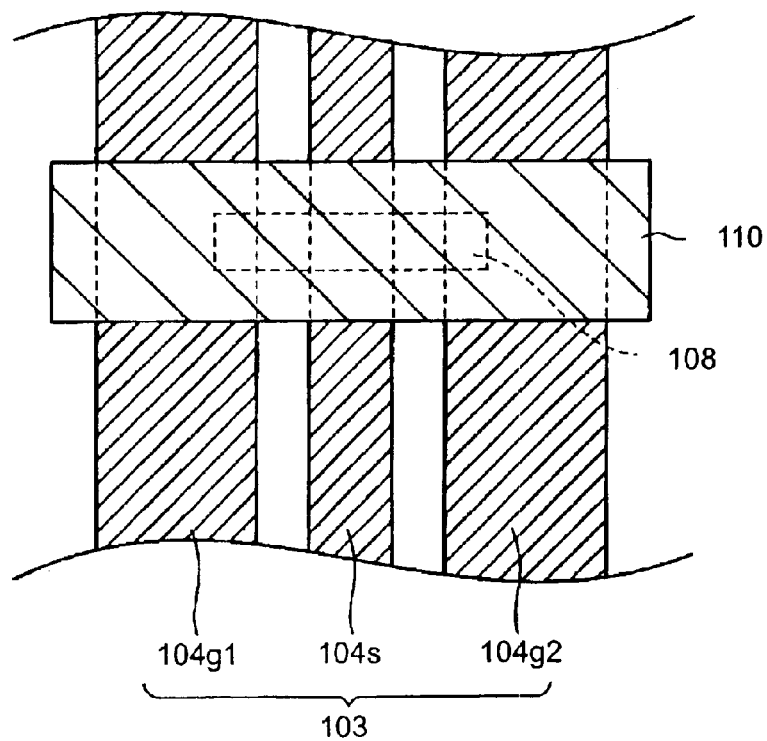

The movable electrode 108 is provided on a substrate facing surface 106a of the movable body 106. The movable electrode 108 faces toward the lines 104g1, 104s and 104g2 partially from the one ground electrode 104g1 to the other ground electrode 104g2 through the signal line 104s of the coplanar line 103. A movable side electrode 110 for movable body displacement is provided on an upper member facing surface 106b of the movable body 106. FIG. 1B is a schematic diagram showing a positional relationship example of the coplanar line 103, the movable electrode 108 and the movable side electrode 110 for movable body displacement. FIG. 1B is a top view of FIG. 1A.

Furthermore, a fixed side electrode 111 for movable body displacement and the movable side electrode 110 for movable body displacement are provided on the upper member 105. The fixed side electrode 111 for movable body displacement faces toward the movable side electrode 110 for movable body displacement. Furthermore, the upper member 105 includes a through-hole 112. The movable side electrode 110 for movable body displacement and the fixed side electrode 111 for movable body displacement extend outside through the through-hole 112.

Direct-current voltage (such as a direct current voltage of about 5V) is externally applied between the movable side electrode 110 for movable body displacement and the fixed side electrode 111 for movable body displacement via the through-hole 112. In this case, electrostatic gravity is produced between the movable side electrode 110 for movable body displacement and the fixed side electrode 111 for movable body displacement. Thus, the movable body 106 is pulled toward the upper member 105 by the electrostatic gravity. As a result, the space between the signal line 104s of the coplanar line 103 and the movable electrode 108 is increased. As a result, the electrostatic capacitance C between the signal line 104s and the movable electrode 108 is decreased. In other words, according to the first preferred embodiment, a variable capacitance device includes the movable side electrode 110 for movable body displacement and the fixed side electrode 111 for movable body displacement. The variable capacitance device changes the electrostatic capacitance C between the signal line 104s of the coplanar line 103 and the movable electrode 108 by displacing the movable body 106.

In the shunt switch element 101 according to the first preferred embodiment, the variable capacitance device including the movable side electrode 110 for movable body displacement and the fixed side electrode 111 for movable body displacement displaces the movable body 106 toward the upper member 105. Thus, the electrostatic capacitance C between the coplanar line 103 and the movable electrode 108 is decreased. Due to the change in electrostatic capacitance C, the impedance is increased when viewed from the signal line 104s to the ground lines 104g1 and 104g2 through the movable electrode 108. When viewed from the signal line 104s to the ground side through the movable electrode 108, the lines are open to high frequencies. As a result, the conducting of signals through the coplanar line 103 (signal line 104s) is turned ON.

Conversely, when electrostatic gravity does not exist between the movable side electrode 110 for movable body displacement and the fixed side electrode 111 for movable body displacement, the movable body 106 is located at the position shown in FIG. 1A. Then, the electrostatic capacitance C is increased between the coplanar line 103 and the movable electrode 108. Thus, the signal line 104s short circuits with the ground side through the movable electrode 108 with respect to high frequencies. As a result, the conducting of signals through the coplanar line 103 (signal line 104s) is turned OFF.

According to the first preferred embodiment, the movable electrode 108 has a desired electrode surface size in accordance with frequencies of high frequency signals conducting through the coplanar line 103. By using an electrode surface of a desired size, the conducting of signals through the coplanar line 103 can be turned ON or OFF precisely by using a change in electrostatic capacitance between the movable electrode 108 and the signal line 104s. The movable side electrode 110 for movable body displacement has a larger electrode surface than that of the movable electrode 108. Therefore, a lower direct-current voltage moves the movable body 106 toward the upper member 105 using the electrostatic gravity.

According to the first preferred embodiment, the movable electrode 108 controls ON and OFF of the conducting of signals through the coplanar line 103. The movable side electrode 110 for movable body displacement displaces the movable body 106. The movable electrode 108 and the movable side electrode 110 for movable body displacement are separated. Thus, the movable electrode 108 and the movable side electrode 110 for movable body displacement can be designed separately. Therefore, the flexibility in electrode design is greatly improved as compared to the shunt switch element 130 including the electrode bridge 134 which functions as both the movable electrode 108 and the movable side electrode 110 for movable body displacement.

As a result, the movable electrode 108 can be designed to have an appropriate size for precisely turning ON and OFF of the conducting of the high frequency signals in accordance with frequencies of signals through the coplanar line 103. The movable side electrode 110 for movable body displacement can also be designed to have an appropriate size for displacing the movable body 106 by using electrostatic gravity produced by low direct-current voltage. In other words, the shunt switch element 101 precisely controls ON and OFF of the conducting of signals through the coplanar line 103 with a greatly reduced amount of power consumption.

Figure 4A:
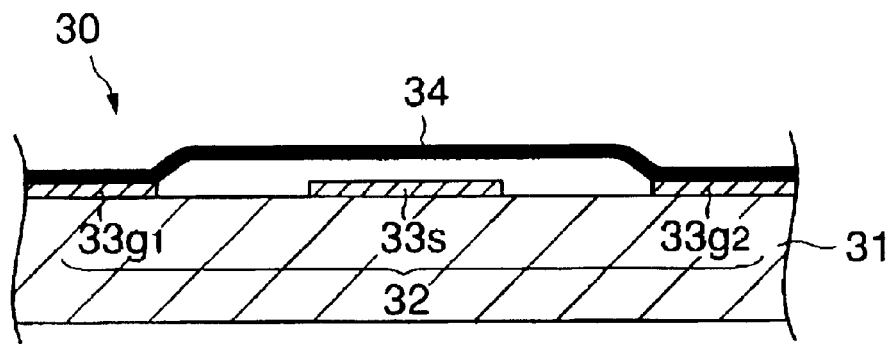
FIGS. 4A to 4C are diagrams showing a conventional example.
Figure 4B:
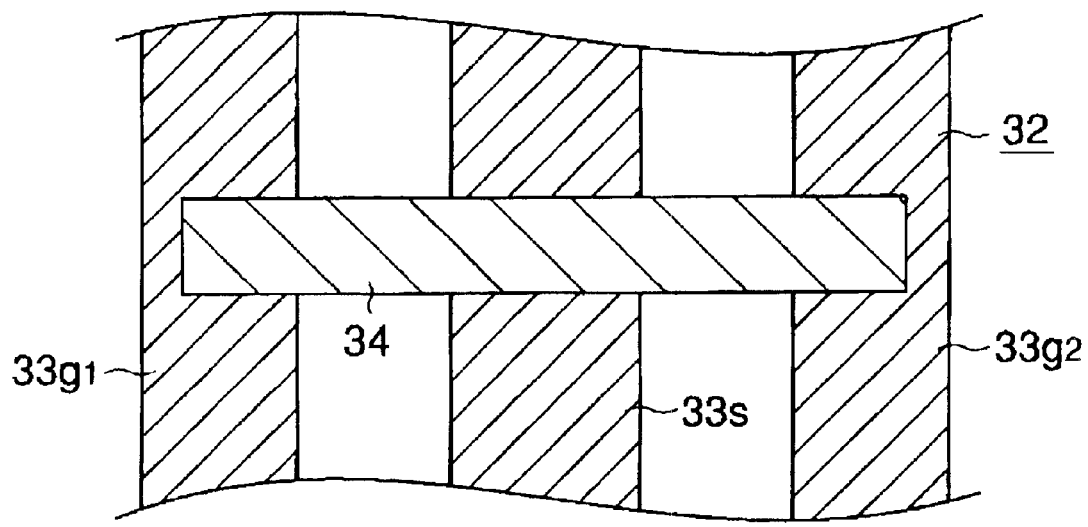
Figure 4C:
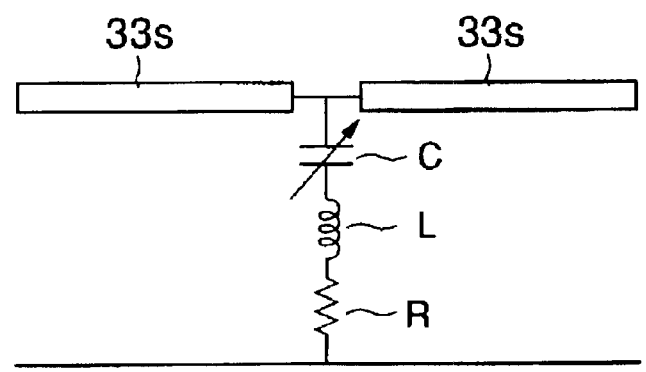

In the shunt switch element 130 shown in FIG. 4, the electrode bridge 134 itself is bent and displaced. Therefore, the metal in the electrode bridge 134 is easily fatigued. According to the first preferred embodiment, the movable body 106 is separate from the movable electrode 108 and the movable side electrode 110 for movable body displacement. The movable electrode 108 and the movable side electrode 110 for movable body displacement are displaced together with the displacement of the movable body 106. Therefore, the metal fatigue of the movable electrode 108 and movable side electrode 110 for movable body displacement is prevented and minimized. When the movable body 106 includes a flexible material, deterioration due to the displacement of the movable body 106 is prevented. As a result, with the construction according to the first preferred embodiment, the durability of the shunt-switch element 101 is greatly improved.

A second preferred embodiment will be described below. In describing the second preferred embodiment, the same reference numerals are given to the same components as those of the first preferred embodiment. The description of the same components is omitted.

Figure 2:
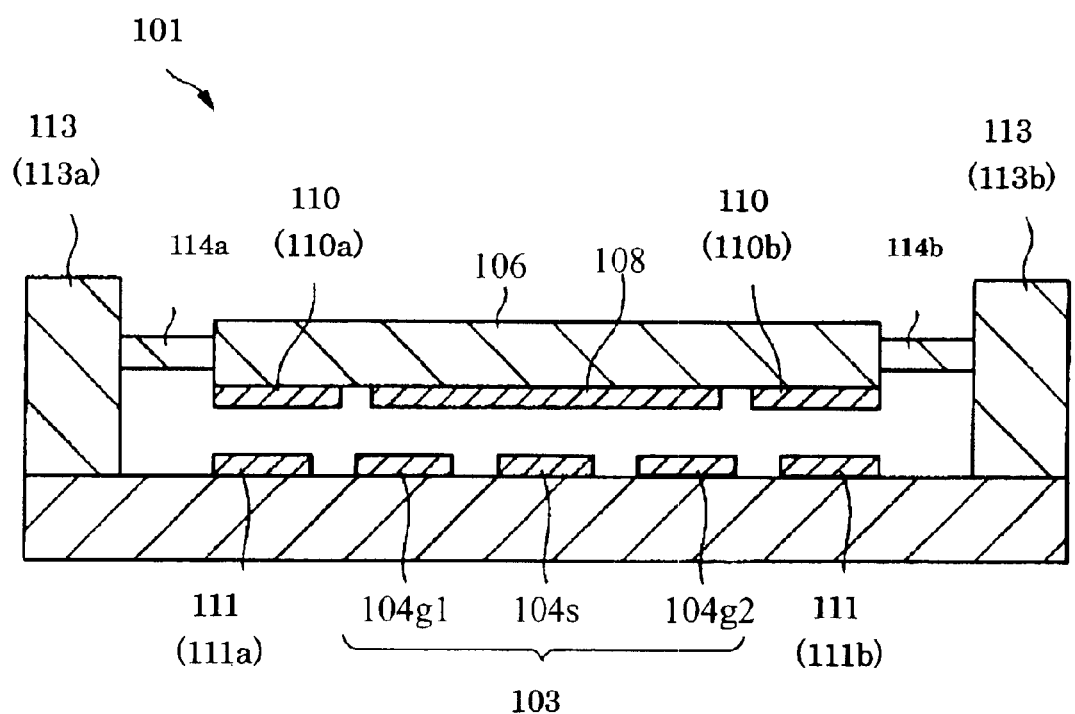
FIG. 2 is a schematic section diagram showing a second preferred embodiment of the present invention.

According to the second preferred embodiment, as shown in FIG. 2, the movable side electrodes 110 (110*a* and 110*b*) for movable body displacement are provided on a substrate-facing surface of the movable body 106, instead of on the movable side electrode 110 for movable body displacement on the movable body 106. The movable side electrodes 110 for movable body displacement are spaced apart from the movable electrode 108. On the substrate 102, the fixed side electrodes 111 (111*a* and 111*b*) for movable body displacement face toward the movable side electrodes 110 (110*a* and 110*b*) for movable body displacement. The fixed side electrodes 111 are spaced apart from the coplanar line 103. Fixing portions 113 (113*a* and 113*b*) are provided on the substrate 102. The movable body 106 is provided between the fixing portions 113 and is supported by the fixing portions 113 through bars 114 (114*a* and 114*b*).

In the first preferred embodiment, the fixed side electrode 111 for movable body displacement is provided above the movable body 106. Therefore, the upper member 105 is provided above the movable body 106. According to the second preferred embodiment, the fixed side electrode 111 for movable body displacement is provided on the substrate 102. Therefore, the upper member 105 is not required. Therefore, the upper member 105 is omitted in the second preferred embodiment. As a result, the construction and manufacturing steps of the shunt switch element 101 are greatly simplified.

Furthermore, the upper member 105 is not required and the movable body 106 is not displaced upward by electrostatic gravity of a variable capacitance device having the movable side electrode 110 for movable body displacement and the fixed side electrode 111 for movable body displacement. Therefore, the height of the shunt switch element 101 is greatly reduced.

The rest of the construction is preferably the same as the first preferred embodiment.

Similar to the first preferred embodiment, according to the second preferred embodiment, when direct-current voltage is applied between the movable side electrode 110 for movable body displacement and the fixed side electrode 111 for movable body displacement, electrostatic gravity produced by the direct-current voltage occurs between the movable side electrode 110 for movable body displacement and the fixed side electrode 111 for movable body displacement. The electrostatic gravity pulls the movable body 106 toward the substrate 102. Due to the displacement of the movable body 106, the space between the movable electrode 108 and the coplanar line 103 is decreased. The electrostatic capacitance C between the movable electrode 108 and the coplanar line 103 is increased. Thus, the movable electrode 108 and the coplanar line 103 establish a short circuit for high frequencies. As a result, signal conduction of the coplanar line 103 is turned off. By using the change in electrostatic capacitance C between the movable electrode 108 and the coplanar line 103 due to the displacement of the movable body 106 in this manner, ON and OFF switching of the conducting of high frequency signals of the coplanar line 103 is efficiently controlled.

The present invention is not limited to the first and second preferred embodiments. Various other preferred embodiments are possible. For example, the coplanar line 103 is preferably used as the high frequency signal conducting portion in the first and second preferred embodiments. However, a microstrip line may be provided instead of the coplanar line 103.

In addition to the constructions of the first or second preferred embodiments, an insulating film of SiN, for example, for protection may be provided on at least one of the facing surfaces of the coplanar line 103 and the movable electrode 108.

In the construction of the second preferred embodiment, shown in FIG. 2, the upper member 105 is preferably omitted. However, when a decrease in height is not important, the upper member 105 may be provided above the substrate 102, as in the first preferred embodiment, in order to protect the movable electrode 106 and the coplanar line 103.

Figure 3:
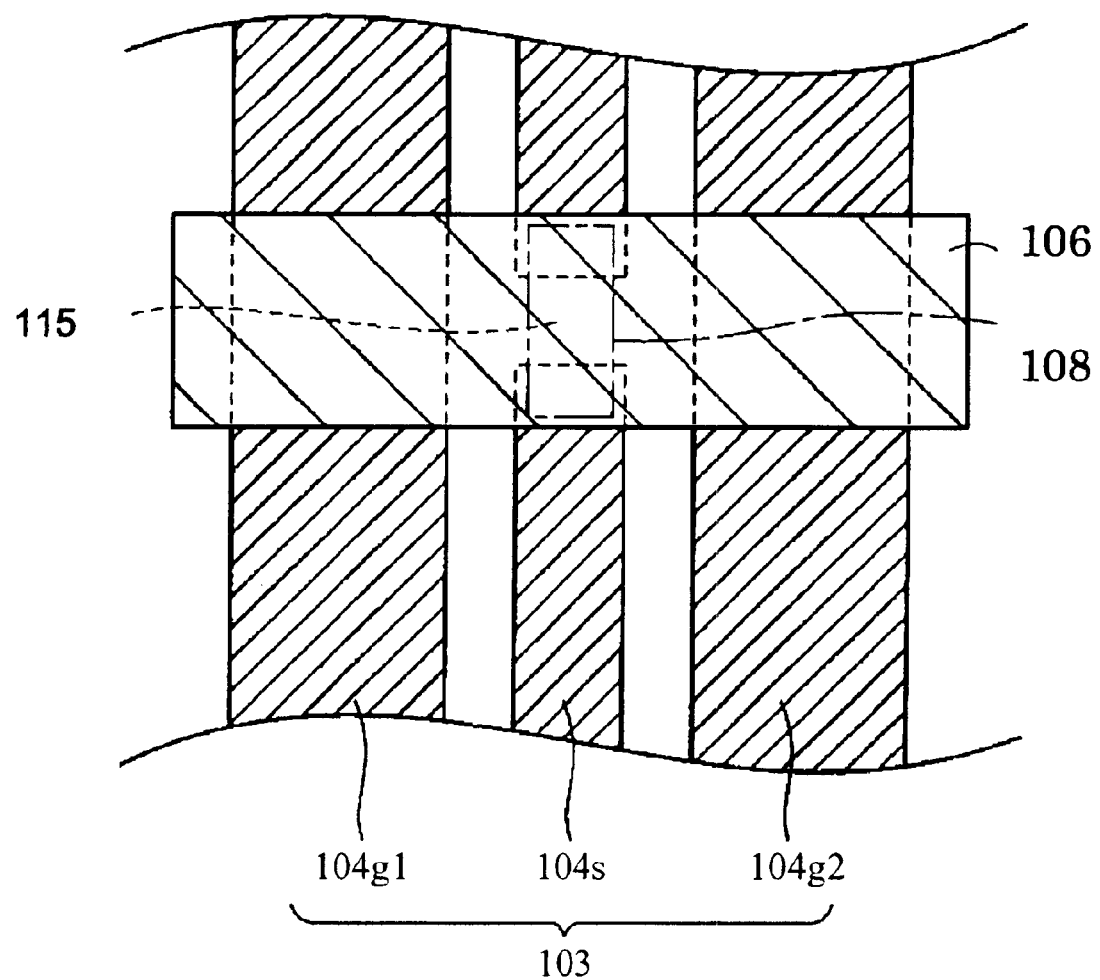
FIG. 3 is a diagram showing a third preferred embodiment of the present invention.

In the first and second preferred embodiments, the shunt switch element 101 is a so-called parallel switch. However, as shown in FIG. 3, the shunt switch element 101 may be a serial switch. In other words, a section 115 is provided in the signal line 104*s* of the coplanar line 103. The movable electrode 108 faces toward lines on both ends of the section 115. In this case, the movable electrode 108 does not face toward the ground lines 104*g*1 and 104*g*2.

In this construction, if the space between the movable electrode 108 and the lines on both ends of the section 115 is decreased, the electrostatic capacitance increases between the movable electrode 108 and the lines on both ends of the section 115. Thus, when the movable electrode 108 and the lines on both ends of the section 115 establish a short circuit for high frequencies, high frequency signals flow into the signal line 104*s* through the movable electrode 108. As a result, the signal conduction of the signal line 104*s* is turned ON. Conversely, if the space between the movable electrode 108 and the lines on both ends of the section 115 is increased, the electrostatic capacitance decreases between the movable electrode 108 and the lines on both ends of the section 115. Thus, the movable electrode 108 and the lines on both ends of the section 115 become open to high frequencies. As a result, the conducting of high frequency signals of the signal line 104 is turned OFF.

In the first and second preferred embodiments, the shunt switch element is used as an example. However, the present invention can be applied to a variable capacitance element functioning as a variable capacitor incorporated in a high frequency circuit, for example.

Here, FIGS. 5 to 9 show a third preferred embodiment of the present invention. In this preferred embodiment, a variable capacitance element is a variable capacitance type switch.

Figure 5:
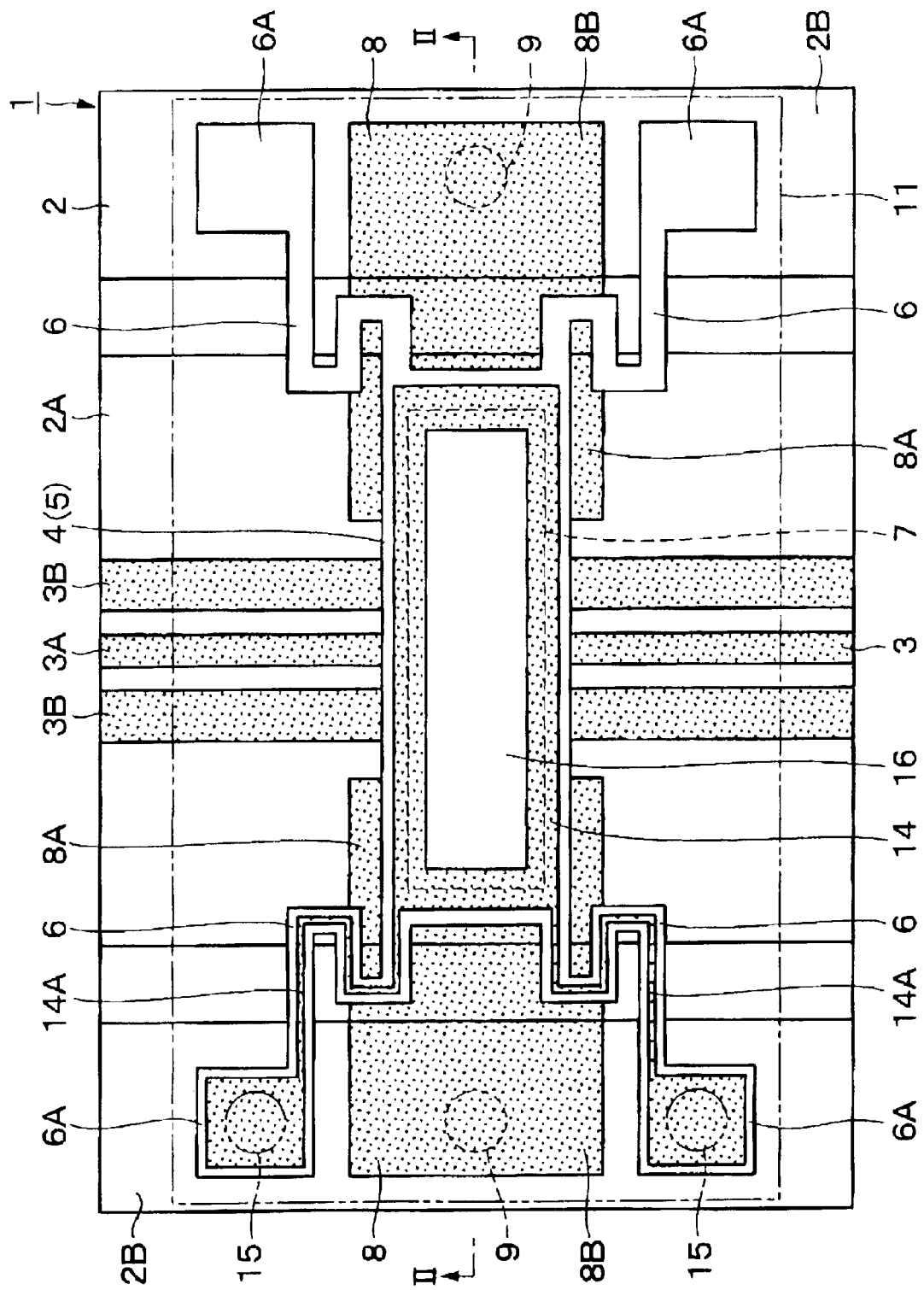
FIG. 5 is a plan view showing a variable capacitance type switch according to a fourth preferred embodiment of the present invention.
Figure 6:
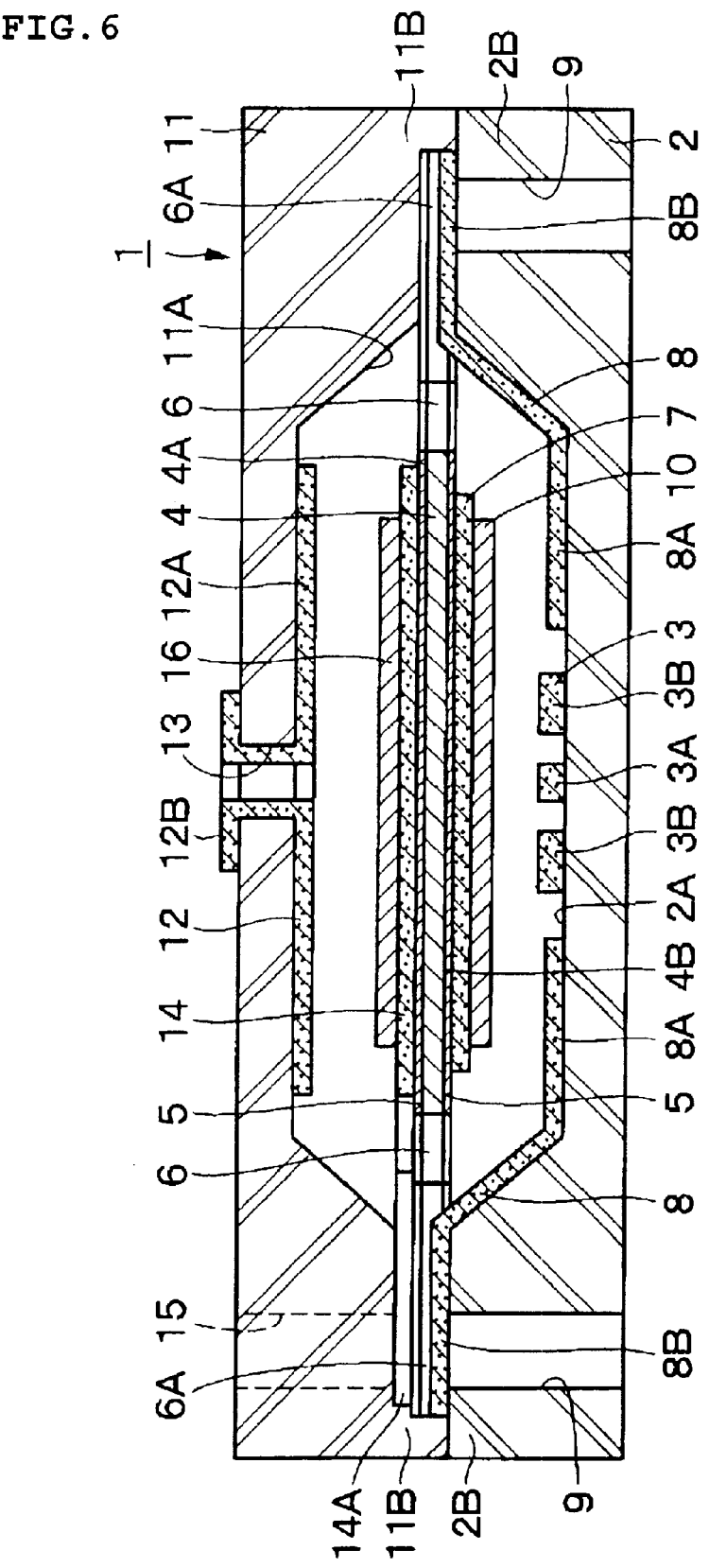
FIG. 6 is a sectional diagram of the variable capacitance type switch, which is taken along II—II in FIG. 4.

In FIGS. 5 to 9, reference numeral 1 indicates a variable capacitance type switch according to this preferred embodiment. Reference numeral 2 indicates a substrate included in the body of the variable capacitance type switch 1. As shown in FIGS. 5 and 6, the substrate 2 includes a four-sided shape containing high-resistant silicon and insulating glass. A depression 2A and left and right joint projections 2B are provided on the front side of the substrate 2. The depression 2A faces toward and is open to a movable body 4, which will be described later. The depression 2A is provided between the left and right joint projections 2B. A cover plate 11, which will be described later, is joined with the left and right joint projections 2B.

Reference numeral 3 is a coplanar line. The coplanar line 3 is provided within the depression 2A as a high frequency signal conducting portion. The coplanar line 3 includes multiple metal films, for example. The coplanar line 3 is provided near a driving electrode 8, which will be described later. The coplanar line 3 includes a signal conductor 3A and left and right ground conductors 3B. The signal conductor 3A conducts high frequency signals. The ground conductors 3B are provided on the left and right side of the signal conductor 3A with a certain amount of space therebetween extending linearly.

Figure 7:
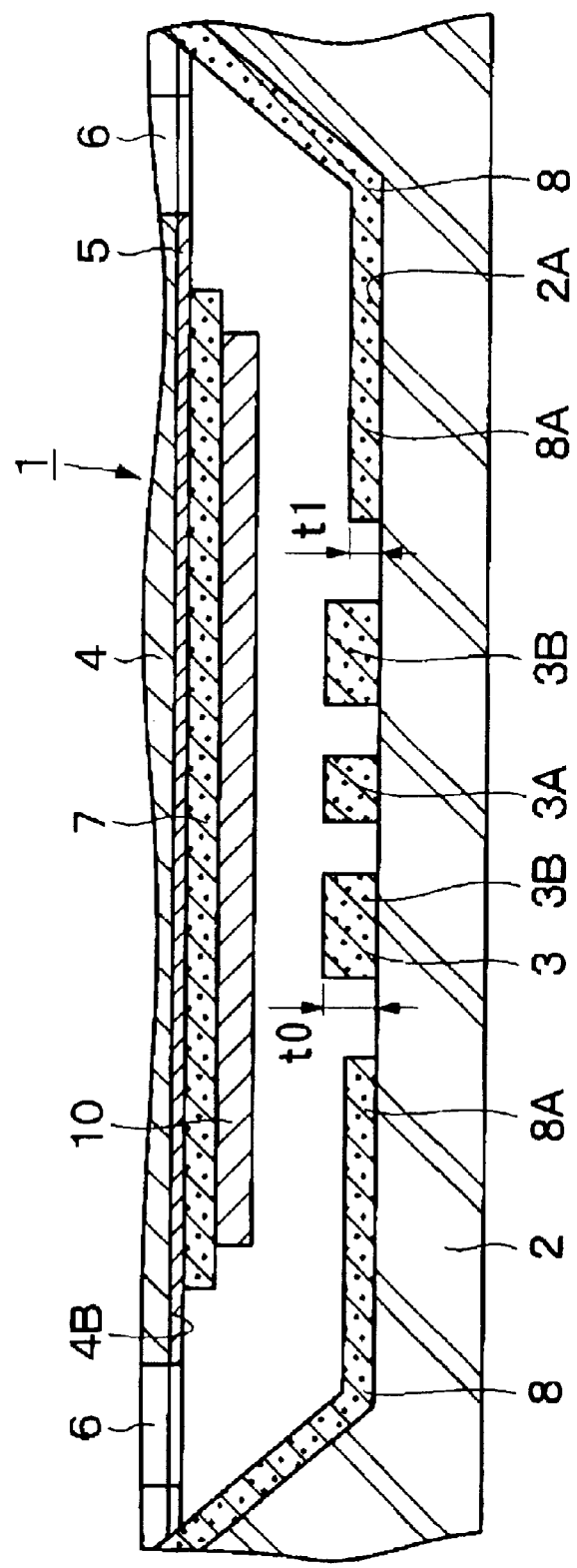

As shown in FIG. 7, each of the conductors 3A and 3B has a four-sided sectional shape having a predetermined thickness of t0, which is about 0.1 to about 50 Rm. The thickness t0 is preferably greater than a thickness t1 of a facing electrode portion 8A of a driving electrode 8 for the reason described below (t0>t1).

Reference numeral 4 is a movable body spaced apart from the substrate 2. The movable body 4 may be integrated with a supporting bar 6, which will be described below, as a long and narrow four-sided plate by performing etching processing on a silicon plate or the like. The movable body 4 includes a front surface 4A and a back surface 4B. The movable body 4 is supported by the supporting bar 6 so as to move in a direction that is substantially perpendicular to the substrate 2. The movable body 4 is positioned between the joint projections 2B of the substrate 2 and faces toward the depression 2A. Insulating films 5 including silicon oxide, silicon nitride or other suitable material, are provided on the front surface 4A and back surface 4B of the movable body 4 and supporting bar 6.

The movable body 4 is driven via a movable electrode 7 and driving electrodes 8, 12 and 14, as described later. Then, the supporting bar 6 is bent and is deformed such that the movable body 4 is displaced from an inactive position shown in FIG. 6 to one side (lower side) or the other side (upper side) in the vertical direction.

Reference numerals 6 indicate, for example, four supporting bars supporting the movable body 4 at the left and right sides. Each of the supporting bars 6 is cranked and can be bent in a direction that is substantially perpendicular to the substrate 2. The base end of each of the supporting bars 6 defines a fixing portion 6A fixed at a joint projection 2B of the substrate 2. The pointed end projects toward the depression 2A and is fixed at four corners of the movable body 4.

Reference numeral 7 indicates a movable electrode provided on the back surface 4A through the film 5. The movable electrode 7 is, for example, a metal film having a long and narrow square shape. The movable electrode 7 extends between the joint projections 2B to the left and right and crosses over the middle portion of the coplanar line 3 in the longitudinal direction. The left and right middle portions of the movable electrode 7 face toward the conductors 3A and 3B of the coplanar line 3 through a vertical space. The left and right ends of the movable electrode 7 face toward the driving electrodes 8.

The movable electrode 7 is arranged between driving electrodes 8 and 12, as described above, and is displaced vertically together with the movable body 4. By moving toward and away from the coplanar line 3, the movable electrode 7 is held either at a signal shut-off position (first switching position) shown in FIG. 8 or a signal conducting position (second switching position) shown in FIG. 9. Thus, the electrostatic capacitance between the conductors 3A and 3B depends upon the position of the movable electrode 7. Therefore, the coplanar line 3 is switched between a shut-off state and a conducting state. In the shut-off state, high frequency signals are shut of at the movable electrode 7 position. In the conducting state, signals are conducted to both sides of the movable electrode 7 in the longitudinal direction.

Reference numerals 8 indicate, for example, two first driving electrodes on the substrate 2. As shown in FIGS. 5 to 7, each of the first driving electrodes 8 is preferably a band-shaped metal film having a thickness t1, for example. The first driving electrode 8 is fixed to the joint projection 2B of the substrate 2. The coplanar line 3 is provided between the left and right first driving electrodes 8.

Each of the driving electrodes 8 includes a facing electrode portion 8A and a connecting portion 8B. The facing electrode portion 8A faces toward the movable electrode 7 within the depression 2A of the substrate 2 with a vertical space therebetween. The connecting portion 8B extends from the facing electrode portion 8A to the joint projection 2B of the substrate 2 and is connected to an external power supply (not shown) through a through-hole 9 in the substrate 2.

Figure 8:
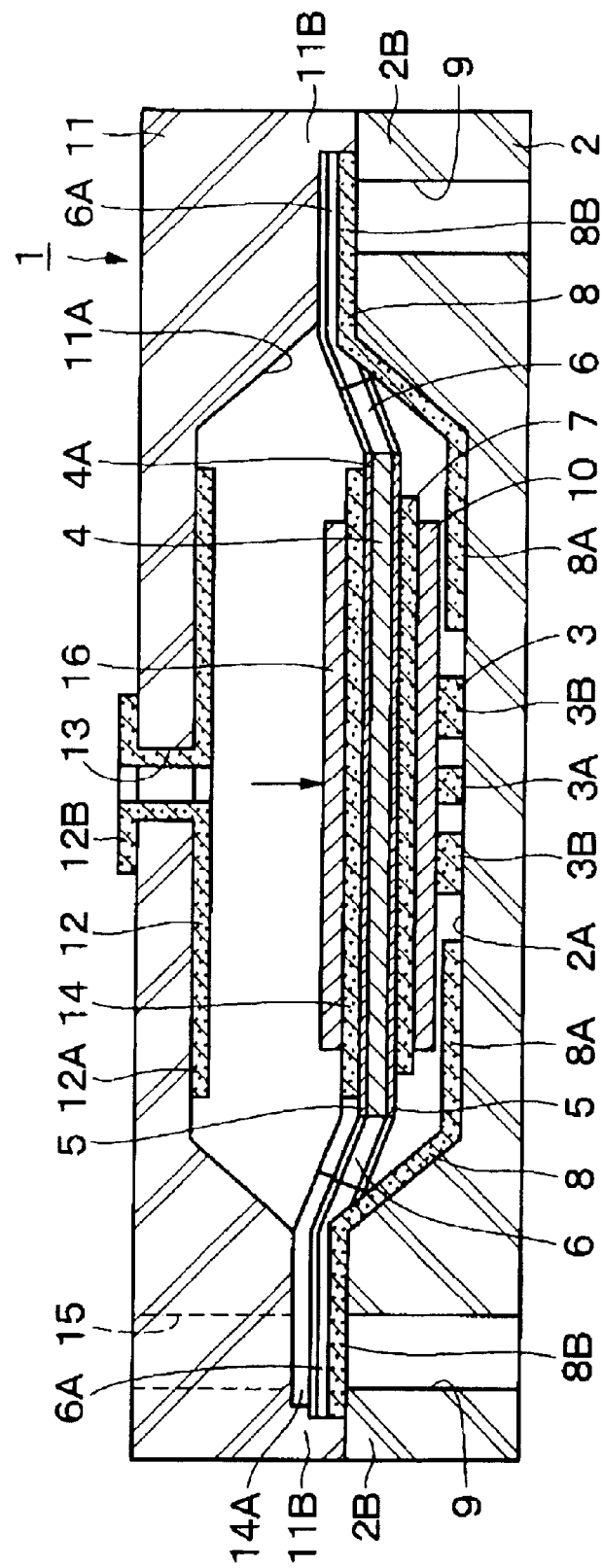
FIG. 8 is a section diagram showing a state where a movable electrode and the like are displaced to a signal shut-off position.

When direct-current voltage, for example, is applied between the left and right driving electrodes 8, electrostatic gravity is produced between the movable electrode 7 and the driving electrode 8. Due to the electrostatic gravity, the movable body 4 is displaced toward the coplanar line 3. Thus, the movable electrode 7, as shown in FIG. 8, is pressed against the coplanar line 3 through a dielectric film 10, which will be described later. As a result, the movable electrode 7 is held at the signal shut-off position near the conductors 3A and 3B.

Reference numeral 10 indicates a dielectric film, which is a first stopper provided in the movable electrode 7. The dielectric film 10 includes a dielectric material such as a silicon oxide film and a silicon nitride film. The dielectric film 10 has a thickness of about 0.01 $\mu$m to about 50 $\mu$m.

When the movable electrode 7 is displaced to the signal shut-off position as shown in FIG. 8, the dielectric film 10 abuts with the conductors 3A and 3B of the coplanar line 3. Thus, the movable electrode 7 is insulated from the coplanar line 3 and the driving electrode 8. As a result, the dielectric film 10 securely holds the movable electrode 7 in the signal shut-off position in collaboration with the electrostatic gravity between the electrodes 7 and 8.

In this case, the thickness t0 of the coplanar line 3 is greater than the thickness t1 of the driving electrode 8. Therefore, the dielectric film 10 does not abut with the driving electrode 8 when the movable electrode 7 is at the signal shut-off position. The dielectric film 10 is provided between the coplanar line 3 and the movable electrode 7 with no space therebetween. Thus, the electrostatic capacitance between the conductors 3A and 3B of the coplanar line 3 can be changed depending upon the position of the movable electrode 7 between the signal shut-off position and the signal conducting position. The variable capacitance type switch 1 securely switches between the conducting state and the shut-off state.

Reference numeral 11 indicates a cover plate over the depression 2A of the substrate 2. As shown in FIGS. 5 and 6, the cover plate 11 has a four-sided con figuration and includes a highly resistant silicon material or an insulating glass material. A depression 11A and left and right joint projections 11B are provided on the back surface of the cover plate 11. The depression 11A opens to the depression 2A of the substrate 2. The left and right joint projections 11B are provided on both sides of the depression 11A and are connected to the joint projections 2B of the substrate 2. The fixing portion 6A of each of the supporting bars 6 and the connecting portion 8B of each of the driving electrodes 8 are provided between the joint projections 2B and 11B of the substrate 2 and the cover plate 11.

Reference numeral 12 indicates a second driving electrode provided on the cover plate 11. The second driving electrode 12 includes a metal film, for example, as shown in FIG. 6. The second driving electrode 12 is provided on the vertically opposite side of the driving electrode 8 through the movable body 4 (movable electrode 7). The driving electrode 12 includes a facing electrode portion 12A and a connecting portion 12B. The facing electrode portion 12A faces toward a driving electrode 14, which will be described later, within the depression 11A of the cover plate 11 with a vertical space in between. The connecting portion 12B extends from the facing electrode portion 12A to the front surface of the cover plate 11 and is connected to an external power supply (not shown) through a through-hole 13 in the cover plate 11, for example.

Figure 9:
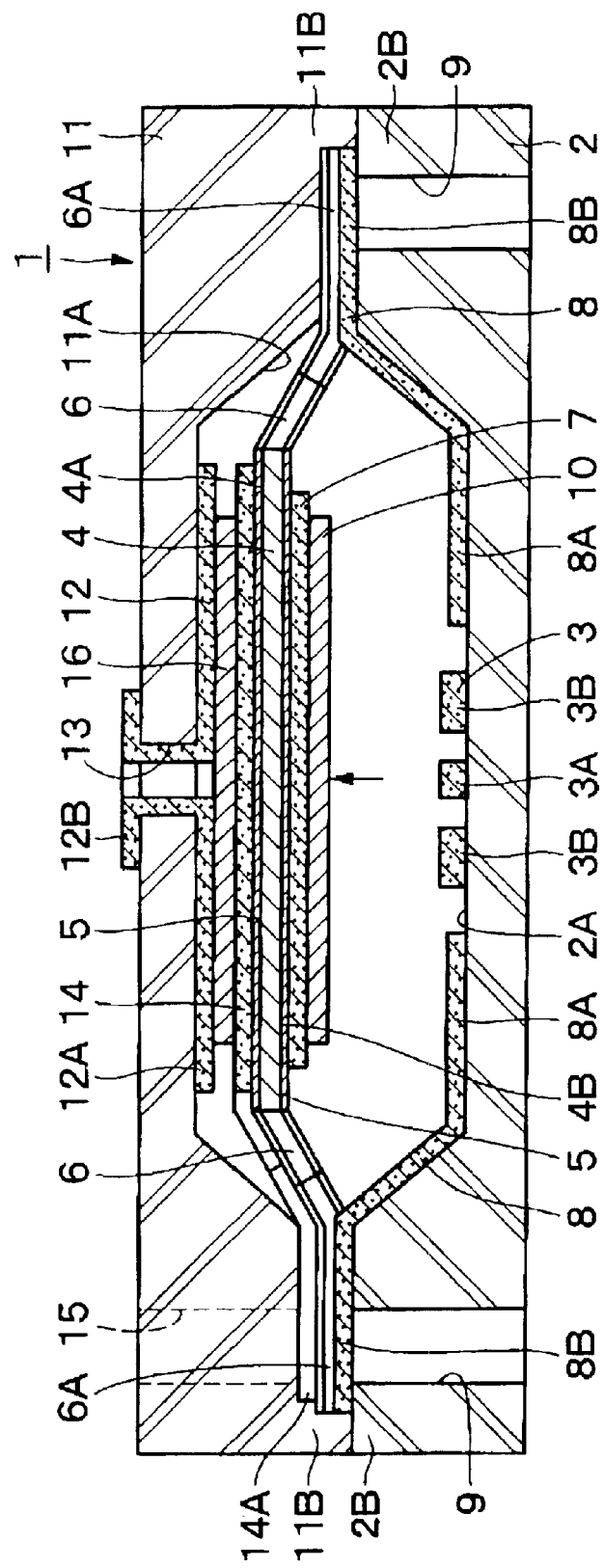
FIG. 9 is a section diagram showing a state where a variable electrode and the like are displaced toward a signal conducting position.

When, for example, direct-current voltage is applied between the driving electrode 12 and the driving electrode 14, electrostatic gravity is produced between the electrodes 12 and 14. The driving electrode 12 displaces the movable electrode 4 away from the coplanar line 3 via the electrostatic gravity. Thus, an insulating film 16, which will be described later, abuts with the driving electrode 12, as shown in FIG. 9. As a result, the movable electrode 7 is held at a signal conducting position away from the coplanar line 3.

Reference numeral 14 indicates a third electrode provided on the front surface 4A of the movable body 4 through the film 5. As shown in FIGS. 5 and 6, the third driving electrode 14 includes a metal film, for example. The third driving electrode 14 faces toward the driving electrode 12 with a desired amount of vertical space therebetween. The driving electrode 14 includes two wire portions 14 extending to the fixing portion 6A through the front side of the supporting bar 6, for example. Each of the wire portions 14A is connected to an external power supply (not shown) through the through-hole 15 in the cover plate 11.

Reference numeral 16 indicates an insulating film, which is a second stopper provided in the driving electrode 14. The insulating film 16 includes an insulating material such as a silicon oxide film or a silicon nitride film. The insulating film 16 abuts with the driving electrode 12 when the movable electrode 7 is displaced to the signal conducting position as shown in FIG. 9. The insulating film 16 insulates the driving electrodes 12 and 14 from each other. The insulating film 16 securely holds the movable electrode 7 in the signal conducting position in collaboration with the electrostatic gravity between the electrodes 12 and 14.

The variable capacitance-type switch 1 according to this preferred embodiment has the above-described construction. The operation will be described below.

First of all, when voltage is applied between the two driving electrodes 8, electrostatic gravity is produced between these driving electrodes 8 and the movable electrode 7 as shown in FIG. 8. Then, the supporting bar 6 is bent and deformed. Thus, the movable body 4 is displaced downward to a position where the dielectric film 10 abuts with the coplanar line 3. The movable electrode 7 is pressed against the coplanar line 3 through the dielectric film 10 via electrostatic energy between the movable electrode 7 and the driving electrodes 8. Therefore, the movable electrode 7 is securely held by the dielectric film 10 in the signal shut-off position.

As a result, the movable electrode 7 and the dielectric film 10 are arranged between the signal conductor 3A and the ground conductor 3B of the coplanar line 3. The electrostatic capacitance between these conductors 3A and 3B are increased to a greater extent than the case where the movable electrode 7 is separated, depending on the dielectric constant of the dielectric film 10. Therefore, the conductors 3A and 3B are short circuited at the position of the movable electrode 7 for alternate signals having a frequency (oscillating frequency) f determined by an equation EQ 1 below.

$$f = \frac{1}{2\pi\sqrt{L \cdot C}} \qquad \text{EQ 1}$$

where L is an inductance of the movable electrode 7 and C is an electrostatic capacitance between the conductors 3A and 3B.

As a result, the high frequency signal having the frequency f is input to one longitudinal side of the coplanar line 3, and the high frequency signal is fully reflected at the position of the movable electrode 7. Therefore, the conducting of the signal to the other side of the coplanar line 3 is shut off. Thus, the variable capacitance type switch 1 can be shut off (OFF).

On the other hand, when voltage is applied between the driving electrodes 12 and 14 as shown in FIG. 9, electrostatic gravity is produced between these electrodes 12 and 14. Thus, the movable body 4 is displaced upward to a position where the insulating film 16 abuts with the driving electrode 12. Then, the movable electrode 7 is securely held by the insulating film 16 in the signal conducting position.

Since the coplanar line 3 is not substantially influenced by the movable electrode 7 and the dielectric film 10, the electrostatic capacitance is reduced between the conductors 3A and 3B. Thus, high frequency signals are conducted in the entire coplanar line 3. As a result, the variable capacitance type switch 1 can be switched to the conducting state (ON).

According to this preferred embodiment, since the movable electrode 7 is provided between the driving electrode 8 and the driving electrode 12, electrostatic gravity is produced by these driving electrodes 8 and 12. Thus, the movable electrode 7 is displaced between the signal shut-off position and the signal conducting position. Voltage is applied either between the electrodes 7 and 8 or between the electrodes 12 and 14. As a result, the movable electrode 7 can be forcibly displaced to the signal shut-off position or signal conducting position by the electrostatic gravity.

The movable electrode 7 is driven largely toward the both vertical sides of the non-conducting position. Thus, when an external force such as vibration and impact is applied to the substrate 2, the conducting and shut-off of high frequency signals can be switched with stability in accordance with the position of the movable electrode 7. Therefore, malfunction of the variable capacitance type switch 1 due to external force and unstable switching operations is securely prevented.

For example, when the coplanar line 3 and the dielectric film 10 are fixed and the movable electrode 7 is fixed at the signal shut-off position, electrostatic gravity occurs between the driving electrodes 12 and 14. Thus, the dielectric film 10 is separated from the coplanar line 3 surely. As a result, the movable electrode 7 is returned to the normal state fast. Also when the movable electrode 7 is fixed at the signal conducting position, electrostatic gravity is produced between the electrodes 7 and 8. Thus, the movable electrode 7 is easily released.

Therefore, the switching operations of the variable capacity type switch 1 are stabilized, the vibration resistance and reliability are greatly improved, and the conducting of high frequency signals can be varied largely between the signal conducting position and the signal shut-off position. Thus, the performance of the switching element is greatly improved.

In this case, the coplanar line 3 preferably has a thickness t0 greater than the thickness t1 of the driving electrode 8. Also, the dielectric film 10 is provided between the movable electrode 7 and the coplanar line 3. Therefore, when the movable electrode 7 is displaced to the signal shut-off position, the dielectric film 10 abuts with the coplanar line 3. Thus, the dielectric film 10 securely insulates the coplanar line 3 from the movable electrode 7. Hence, the movable electrode 7 is securely held in the signal shut-off position by electrostatic gravity between the electrodes 7 and 8 and the dielectric film 10. Thus, the displacement of the movable electrode 7 due to vibration and impact and unstable operations when signals are shut off are prevented.

Furthermore, when the movable electrode 7 is held in the signal shut-off position, the dielectric film 10 on the movable electrode 7 side abuts with the coplanar line 3. The electrostatic capacitance between the conductors 3A and 3B is increased by the dielectric film 10 to a greater extent than when the movable electrode 7 is in the signal conducting position.

The insulating film is provided between the driving electrode 14 and the driving electrode 12. When the movable electrode 7 is displaced at the signal conducting position, the insulating film 16 abuts with the driving electrode 12. Thus, the insulating film 16 insulates the driving electrodes 12 and 14 from each other. Therefore, the movable electrode 7 is held in the signal conducting position with stability by the electrostatic gravity between the electrodes 12 and 14 and the insulating film 16.

The movable body 4 is movably supported by the supporting bars 6. The movable electrode 7 is provided on the back surface 4B of the movable body 4. The driving electrode 14 is provided on the front surface 4A of the movable body 4. Therefore, the movable body 4 is supported and balanced by the supporting bars 6 on the both left and right sides. Thus, the movable electrode 7 is displaced with stability horizontally with the substrate 2. The movable electrode 7 and driving electrode 14 including metal films can be provided at a required position of the movable body 4. As a result, the degree of flexibility of designing the variable capacitance type switch 1 is greatly improved.

Figure 10:
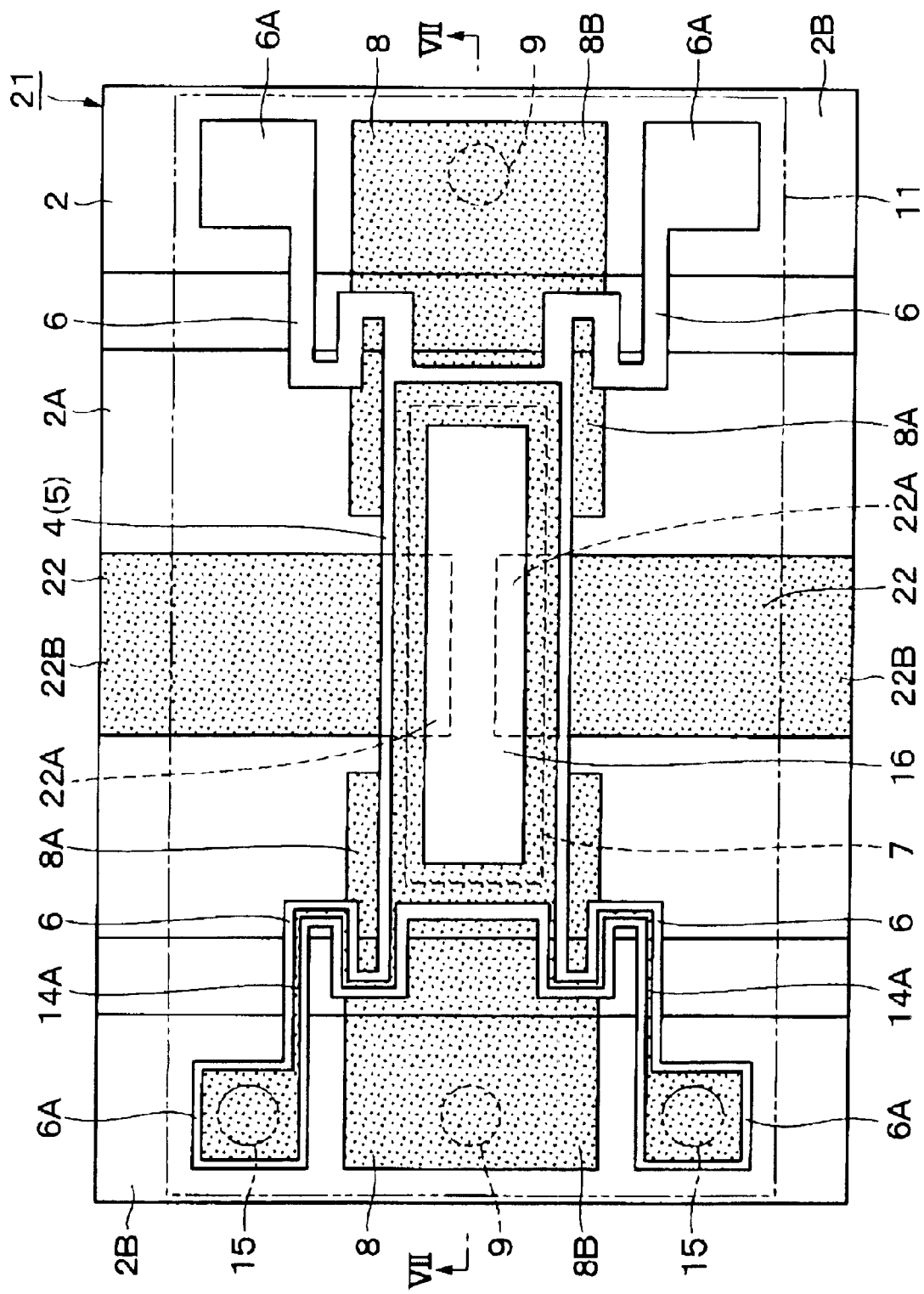
FIG. 10 is a plan view showing a variable capacitor according to a fifth preferred embodiment of the present invention.

Next, a fourth preferred embodiment of the present invention will be described with reference to FIGS. 10 to 12. This preferred embodiment is a variable capacitor. In describing the fourth preferred embodiment, the same reference numerals are given to the same components as those of the third preferred embodiment. The description of like components will be omitted.

Reference numeral 21 indicates a variable capacitor according to this preferred embodiment. The variable capacitor 21 preferably includes a substrate 2, a movable body 4, a supporting bar 6, a movable electrode 7, driving electrodes 8, 12 and 14, a dielectric film 10, a cover plate 11 and an insulating film 16 in substantially the same manner as the variable capacitance type switch according to the third preferred embodiment. However, a fixing electrode 22, which will be described later, is provided within a depression 2A of the substrate 2 instead of the coplanar line 3 of the third preferred embodiment.

Reference numerals 22 indicate, for example, two fixed electrodes included in the variable capacitor 21. As shown in FIGS. 10 and 11, each of the fixed electrodes 22 includes a long and narrow metal film extending in a band shape. The fixed electrodes 22 are located in the front and rear of the substrate 2 with spaces therebetween. The fixed electrode 22 includes a facing electrode portion 22A and a connecting portion 22B. The facing electrode portion 22A faces toward the movable electrode 7 with a vertical space therebetween. The connecting portion 22B extends from the facing electrode portion 22A to the outside and is connected to an input side of a signal processing circuit 23, which will be described later.

Reference numeral 23 indicates a signal processing circuit, which is a voltage control device connected to the variable capacitor 21. As shown in FIG. 12, the output side of the signal processing circuit 23 is connected to the driving electrodes 8, 12 and 14. The input side is connected to the fixed electrodes 22. The signal processing circuit 23 separately controls a voltage Va to be applied between the driving electrodes 8 and a voltage Vb to be applied between the driving electrodes 12 and 14. The signal processing circuit 23 variably sets the size relationship and voltage ratio between the voltages Va and Vb.

Figure 11:
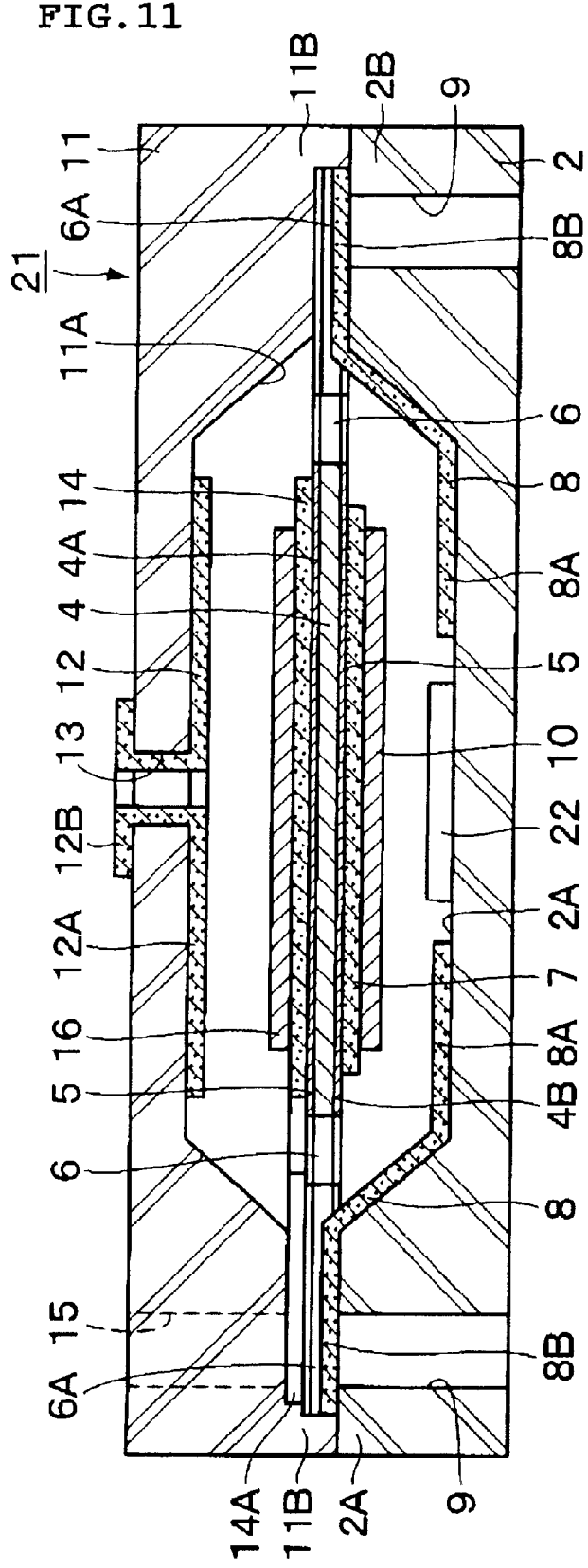
FIG. 11 is a section diagram of a variable capacitor, which is taken at line VII—VII in FIG. 10.
Figure 12:
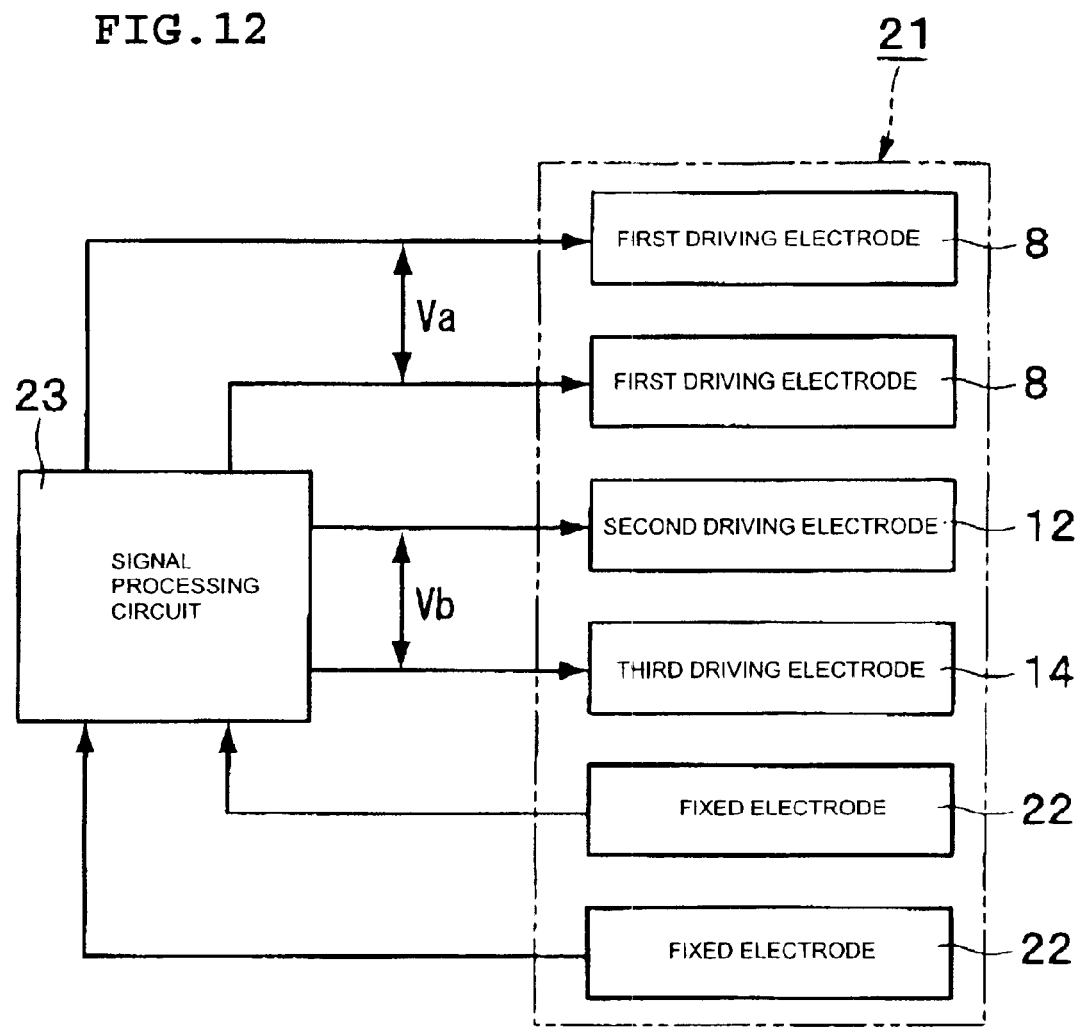
FIG. 12 is a circuit diagram where a variable capacitor and a signal processing circuit are connected.

Thus, the movable electrode 7 is continuously displaced from an inactive position (middle position) shown in FIG. 11 vertically to both sides in accordance with the size relationship and voltage ratio of the voltages Va and Vb output from the signal processing circuit 23. As a result, the movable electrode 7 moves toward and away from the fixed electrode 22.

Then, the electrostatic capacitance between the fixed electrodes 22 through the movable electrode 7 is set at the maximum value when the movable electrode 7 is displaced toward the fixed electrode 22 and the dielectric film 10 abuts with the fixed electrode 22. The electrostatic capacitance is set at the minimum value when the movable electrode 7 is displaced in a direction away from the fixed electrode 22 and the insulating film 16 abuts with the driving electrode 12. Therefore, the signal processing circuit 23 changes the electrostatic capacitance between the fixed electrodes 22 continuously by a large amount between the maximum value and the minimum value.

In this way, this preferred embodiment with the above-described preferred embodiment can also obtain substantially the same operational effects as those of the third preferred embodiment. In particular, according to this preferred embodiment, the electrostatic capacitance of the variable capacitor 21 can be variably set in a wide range by the signal processing circuit 23. Therefore, the performance as a capacitor is greatly improved.

Figure 13:
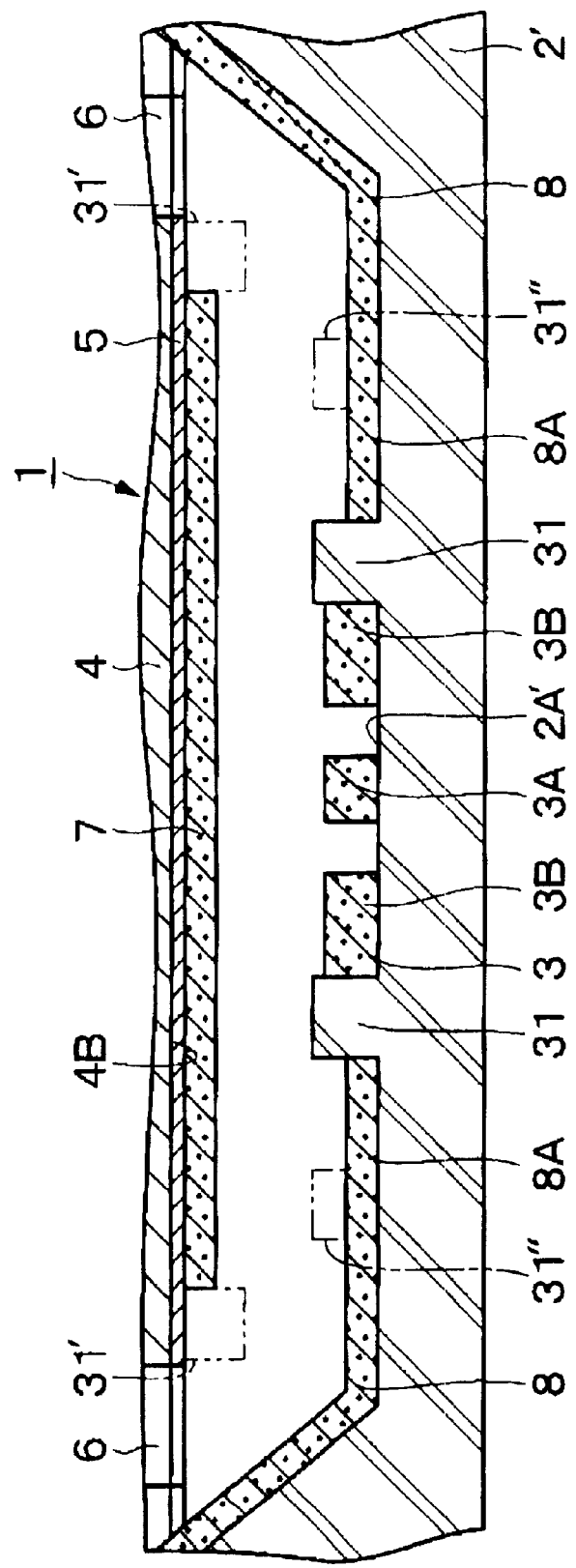
FIG. 13 is an enlarged section diagram of an essential part viewed from the same position as that for FIG. 7 and shows a variable capacitance type switch according to a sixth preferred embodiment of the present invention.

According to the above-described preferred embodiments, the dielectric film 10, which is a stopper, is provided to the movable electrode 7. However, the present invention is not limited thereto. For example, the present invention may have a construction as shown in FIG. 13. In this case, a stopper 31 is provided within a depression 2A' of a substrate 2'. The stopper 31 abuts with the movable electrode 7 instead of the dielectric film 10. As indicated by a broken line in FIG. 13, the stopper 31' may be provided on the movable body 4. Alternatively, a stopper 31" may be provided on the driving electrode 8. On the other hand, other stoppers may be provided not only to the insulating film 16 but also to the movable body 4, the cover plate 11 and the driving electrode 12.

Figure 14:
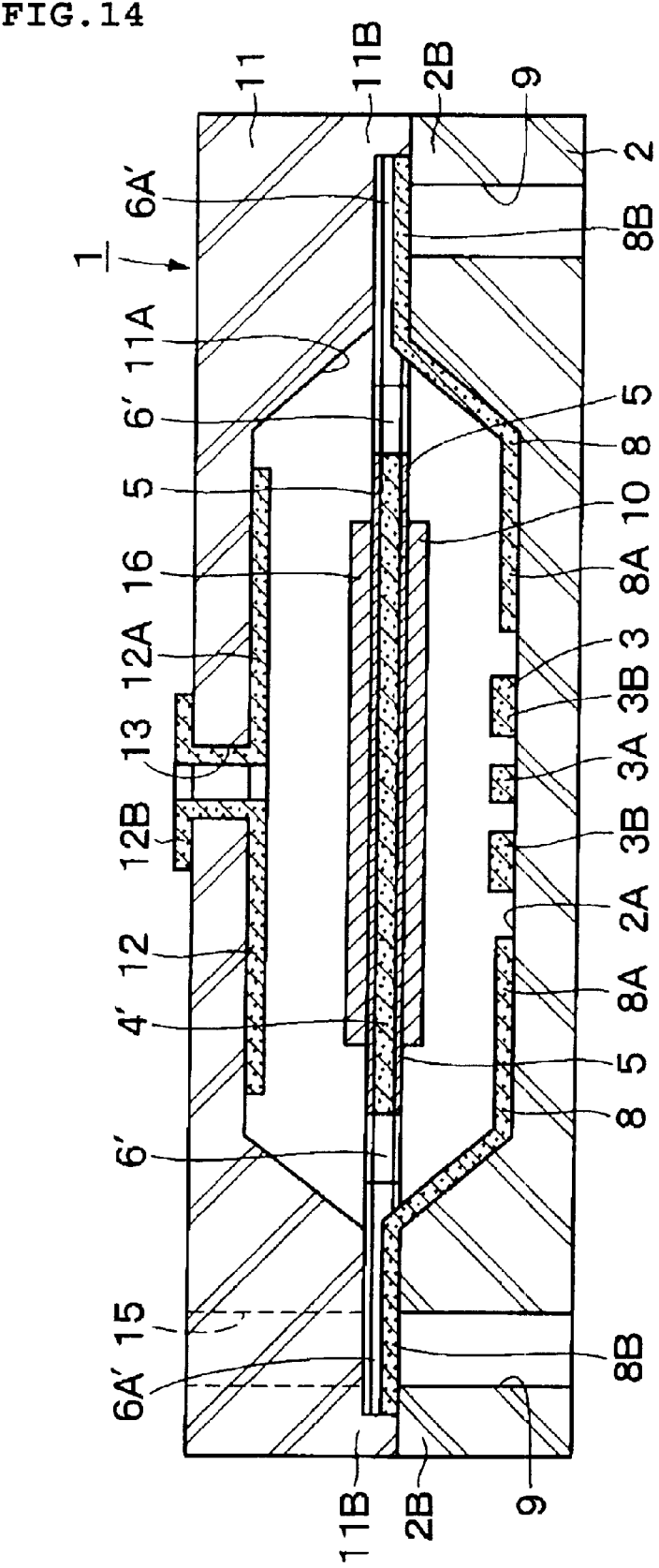
FIG. 14 is a section diagram showing a variable capacitance type switch according to a seventh preferred embodiment of the present invention.

In this preferred embodiment, the movable electrode 7 includes a metal film and is provided in the movable body 4. However, the present invention is not limited thereto. The present invention may have another construction as shown in FIG. 14. In this case, the movable body 4' is a movable electrode including a metal material, a low resistant silicon material or the like. The movable body 4' may be connected to the outside through a conductive supporting bar 6' and fixing portion 6A'. Furthermore, the movable body 4' is displaced by the driving electrodes 8 and 12 to both sides vertically. Here, the movable electrode 7 and the driving electrode according to the above-described embodiments are eliminated.

Figure 15:
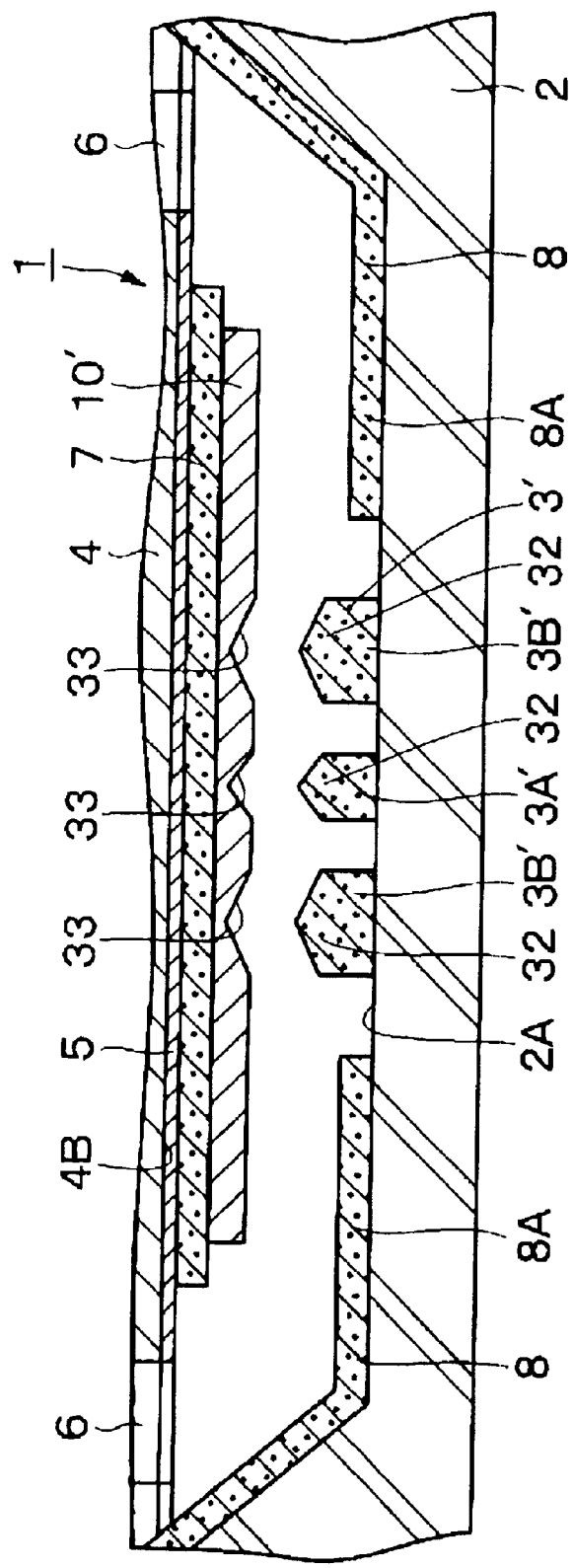
FIG. 15 is an enlarged section diagram of an essential part viewed from the same position as that for FIG. 7 and shows a variable capacitance type switch according to an eighth preferred embodiment of the present invention.

In the third preferred embodiment, a portion where the conductors 3A and 3B of the coplanar line 3 and the dielectric film 10 abut with each other is a flat plane substantially horizontal with respect to the substrate 2. However, the present invention is not limited thereto. Like another example shown in FIG. 15, projections 32 and depressions 33 may be provided on the portion where the conductors 3A' and 3B' of the coplanar line 3' and the dielectric film 10' are provided. The projections 32 and the depressions 33 are matched. Thus, the contact area is increased such that the electrostatic capacitance is further increased.

In the third preferred embodiment, the dielectric film 10 is provided in portions of the movable electrode 7 facing toward the coplanar line 3 and the driving electrode 8. However, the present invention is not limited thereto. The dielectric film may be provided only in the portion of the movable electrode 7 facing toward the coplanar line 3. The dielectric film in the portion facing toward the driving electrode 8 may be eliminated. In this case, the thickness t0 of the coplanar line 3 may be substantially equal to the thickness t1 of the driving electrode 8.

Furthermore, in the third preferred embodiment, the coplanar line 3 is described as an example. However, the present invention is not limited thereto. The present invention may be applied to various kinds of high frequency signal conducting portion including a slot line having a slot between two conductors, for example.

While preferred embodiments of the invention have been described above, it is to be understood that variations and modifications will be apparent to those skilled in the art without departing the scope and spirit of the invention. The scope of the invention, therefore, is to be determined solely by the following claims.

What is claimed is:

1. A variable capacitance element comprising:
   a substrate;
   a high frequency signal conducting portion on the substrate;
   an upper member disposed on the substrate;
   a movable body supported by a single surface of the upper member, the movable body including an insulating semiconductor or an insulator against high frequency signals;
   a movable electrode provided on the movable body and facing toward the high frequency signal conducting portion;
   a fixed side electrode for movable body displacement provided on the upper member in an area facing toward the movable body; and
   a movable side electrode for movable body displacement provided on the movable body, facing toward the fixed side electrode for movable body displacement and spaced apart from the movable electrode; wherein
   the movable side electrode for movable body displacement and the fixed side electrode for movable body displacement displace the movable body toward the substrate using electrostatic gravity produced by applying direct-current voltage between the movable side electrode for movable body displacement and the fixed side electrode for movable body displacement so as to vary electrostatic capacitance between the movable electrode in the movable body and the high frequency signal conducting portion on the substrate.

2. A variable capacitance element according to claim 1, wherein the high frequency signal conducting portion is one of a coplanar line and a microstrip line, and the variable capacitance element is a shunt switch element for controlling ON and OFF of signal conduction of the coplanar line or the microstrip line, which is the high frequency signal conducting portion, by using a change in electrostatic capacitance between the movable electrode and the high frequency signal conducting portion.

3. A variable capacitance element comprising:
   a substrate;
   a high frequency signal conducting portion on the substrate;
   an upper member disposed on the substrate;
   a movable body supported by the upper member at only two ends thereof, the movable body including an insulating semiconductor or an insulator against high frequency signals;
   a movable electrode provided on the movable body and facing toward the high frequency signal conducting portion;
   a fixed side electrode for movable body displacement provided on the upper member in an area facing toward the movable body; and
   a movable side electrode for movable body displacement provided on the movable body, facing toward the fixed side electrode for movable body displacement and spaced apart from the movable electrode; wherein
   the movable side electrode for movable body displacement and the fixed side electrode for movable body displacement displace the movable body toward the substrate using electrostatic gravity produced by applying direct-current voltage between the movable side electrode for movable body displacement and the fixed side electrode for movable body displacement so as to vary electrostatic capacitance between the movable electrode in the movable body and the high frequency signal conducting portion on the substrate.

4. A variable capacitance element according to claim 3, wherein the high frequency signal conducting portion is one of a coplanar line and a microstrip line, and the variable capacitance element is a shunt switch element for controlling ON and OFF of signal conduction of the coplanar line or the microstrip line, which is the high frequency signal conducting portion, by using a change in electrostatic capacitance between the movable electrode and the high frequency signal conducting portion.

5. A variable capacitance element comprising:
   a substrate;
   a high frequency signal conducting portion on the substrate;
   an upper member disposed on the substrate;
   a movable body supported by the upper member, the movable body including an insulating semiconductor or an insulator against high frequency signals;
   a movable electrode provided on the movable body and facing toward the high frequency signal conducting portion;
   a fixed side electrode for movable body displacement provided on the upper member in an area facing toward the movable body; and a movable side electrode for movable body displacement provided on the movable body, facing toward the fixed side electrode for movable body displacement and spaced apart from the movable electrode; wherein only the movable side electrode for movable body displacement and the fixed side electrode for movable body displacement are used to displace the movable body toward the substrate using electrostatic gravity produced by applying direct-current voltage between the movable side electrode for movable body displacement and the fixed side electrode for movable body displacement so as to vary electrostatic capacitance between the movable electrode in the movable body and the high frequency signal conducting portion on the substrate.

6. A variable capacitance element according to claim 5, wherein the high frequency signal conducting portion is one of a coplanar line and a microstrip line, and the variable capacitance element is a shunt switch element for controlling ON and OFF of signal conduction of the coplanar line or the microstrip line, which is the high frequency signal conducting portion, by using a change in electrostatic capacitance between the movable electrode and the high frequency signal conducting portion.

* * * * *